United States Patent [19]

Dolderer

[11] Patent Number: 4,774,909
[45] Date of Patent: Oct. 4, 1988

[54] INTERNAL MIXTURE FORMATION

[76] Inventor: Erich A. Dolderer, 14 Goethestrasse, D-7406 Mossingen 1, Fed. Rep. of Germany

[21] Appl. No.: 930,724

[22] Filed: Nov. 13, 1986

[30] Foreign Application Priority Data

Nov. 15, 1985 [DE] Fed. Rep. of Germany ....... 3541484

[51] Int. Cl.$^4$ ............................................. F02B 75/12
[52] U.S. Cl. ..................................... 123/1 A; 123/527
[58] Field of Search ................. 123/1 A, 27 GE, 527, 123/DIG. 12, 472

[56] References Cited

U.S. PATENT DOCUMENTS

| 2,767,691 | 10/1956 | Mengelkamp et al. | 123/1 A |
| 2,872,911 | 2/1959 | Botto | 123/527 |
| 4,503,832 | 3/1985 | Pefley et al. | 123/527 |

FOREIGN PATENT DOCUMENTS

81/00282 2/1981 PCT Int'l Appl. ................. 123/527

Primary Examiner—E. Rollins Cross
Attorney, Agent, or Firm—Porter, Wright, Morris & Arthur

[57] ABSTRACT

A fuel injection system for an internal combustion engine in which fuel density is adapted to ambient temperature by a combination means heated by the engine cooling system and the injection of fuel in to the engine is related to pressure in the compensation means.

35 Claims, 4 Drawing Sheets

INTERNAL MIXTURE FORMATION

Liquefied gases such as propane and butane, as well as gases carried under high pressure in a motor vehicle, such as city gas, biogas, natural gas and hydrogen, are highly suitable as propulsion gases for movable as well as stationary internal combustion engines. These gases contain neither sulfur nor lead. They also burn in the internal combustion engine without forming solid particles. In a cold start, there is no formation of condensate at the cylinder walls which leads to cold-start corrosion. Contamination of the lubricating oil is reduced, so that the time between oil changes can be increased considerably. The service life of the exhaust gas system is increased owing to the reduction in harmful condensate.

The reduced evolution of harmful products in the exhaust gas is of great significance. If the mixture is formed correctly, nitrogen oxides, which are presently causing problems, are also reduced to a minimum.

This assumes an extremely lean mixture. At present widespread use is made of systems in which the formation of the mixture is carried out outside of the engine. The gases are decompressed and conveyed to an external mixture-forming system. If such a system is made too lean, disturbance of the engine operation immediately makes itself apparent. The disturbance of the engine operation is in turn dependent on the ignition system used.

In contrast with diesel engines, such gas engines have a compression which amounts to ca. 1:12. The efficiency is therefore lower than that of a diesel. In comparison with the diesel, the [fuel] consumption under partial load conditions is significantly higher.

Relationships similar to those obtained with the diesel, as well as higher compression pressures, can only be obtained by forming internal mixtures. This was reported as early as the years 1936–1940. The gases were introduced into the combustion zone under high pressure in a manner similar to diesel fuel.

Great difficulties arise when this is done, especially with liquefied gases such as propane and butane. The gases must be injected while in the liquid state. Owing to the low boiling point, e.g. of propane (−42° C.), the gas must be held under high pressure in order for it to remain in the liquid phase in the injection nozzle. The effect of a pressure drop is such that, when the injection valve is opened, a gas phase will be injected instead of a liquid phase. Furthermore, the ease of ignition of such gases is very low; to achieve self-ignition, it is necessary e.g. to incorporate 4% lubricating oil.

In addition, lubrication problems occur with the injection pump and the injection nozzle.

In addition, liquefied gases such as propane and butane exhibit different liquid-phase densities depending on the temperature. This is shown in the diagram in FIG. 3. This change in density must be compensated. The density difference versus temperature can be compensated directly in electronically controlled systems. In mechanical and hydraulic equipment, this is compensated as follows.

A system is described below which permits both liquefied gases as well as gases under pressure to be used for forming internal mixtures, making use of such known systems, consisting of an injection pump and an injection nozzle for diesel fuel, without decreasing the clearances between the piston and cylinder bore of the injection pump or between the needle of the nozzle and its guide tube; this would require new methods of fabrication. In addition, the lubrication problem is solved.

Figure 1:
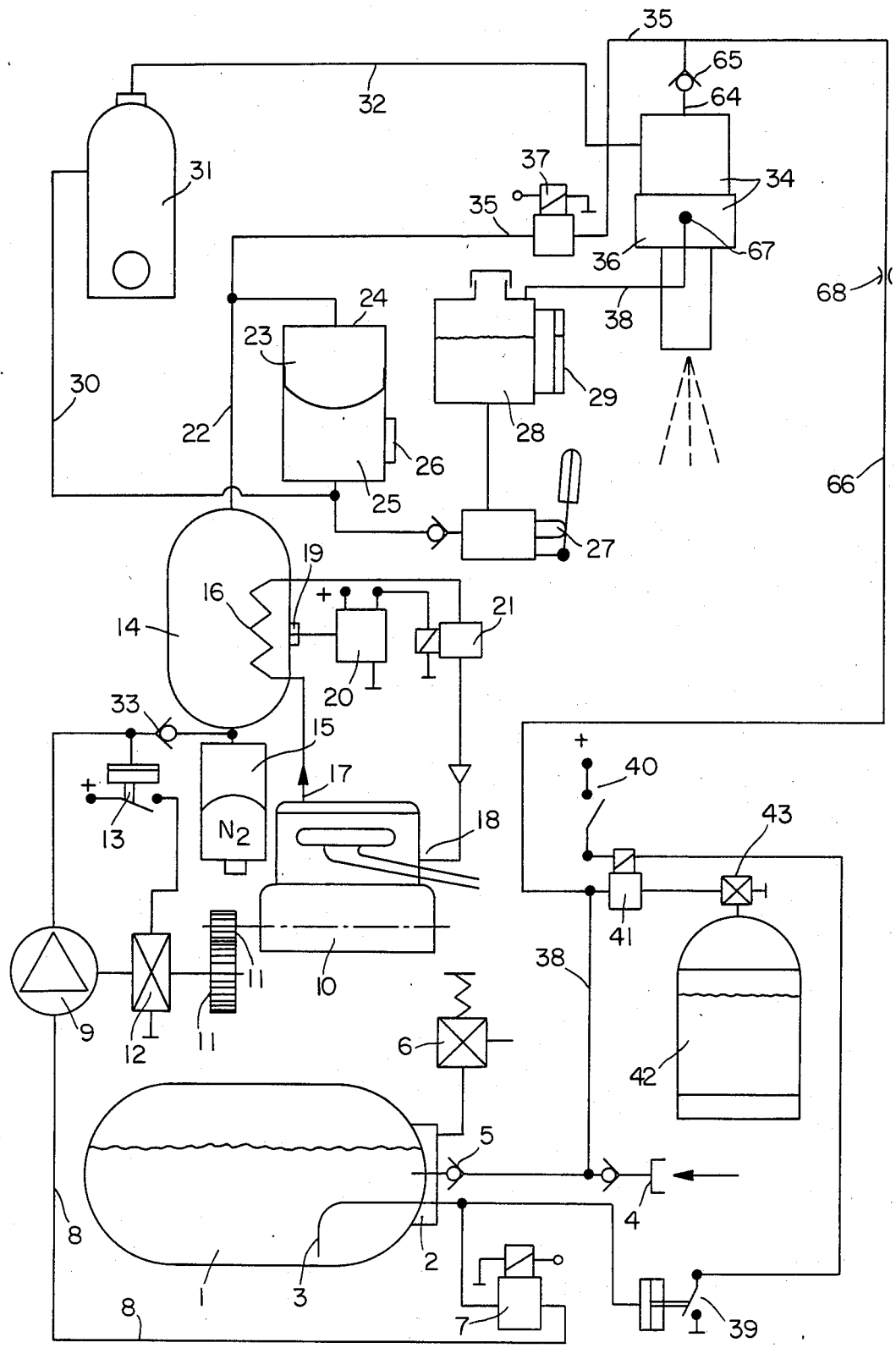
FIG. 1 represents an injection system for liquefied gas.
Figure 2:
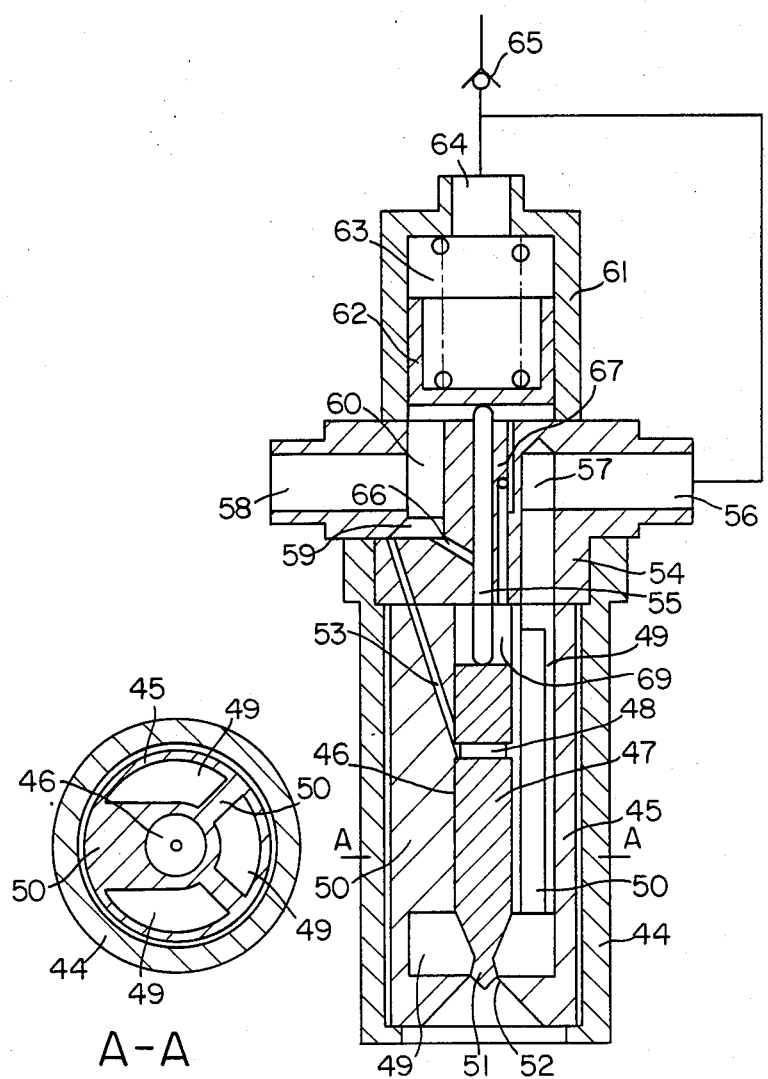
FIG. 2 shows an injection nozzle.
Figure 3:
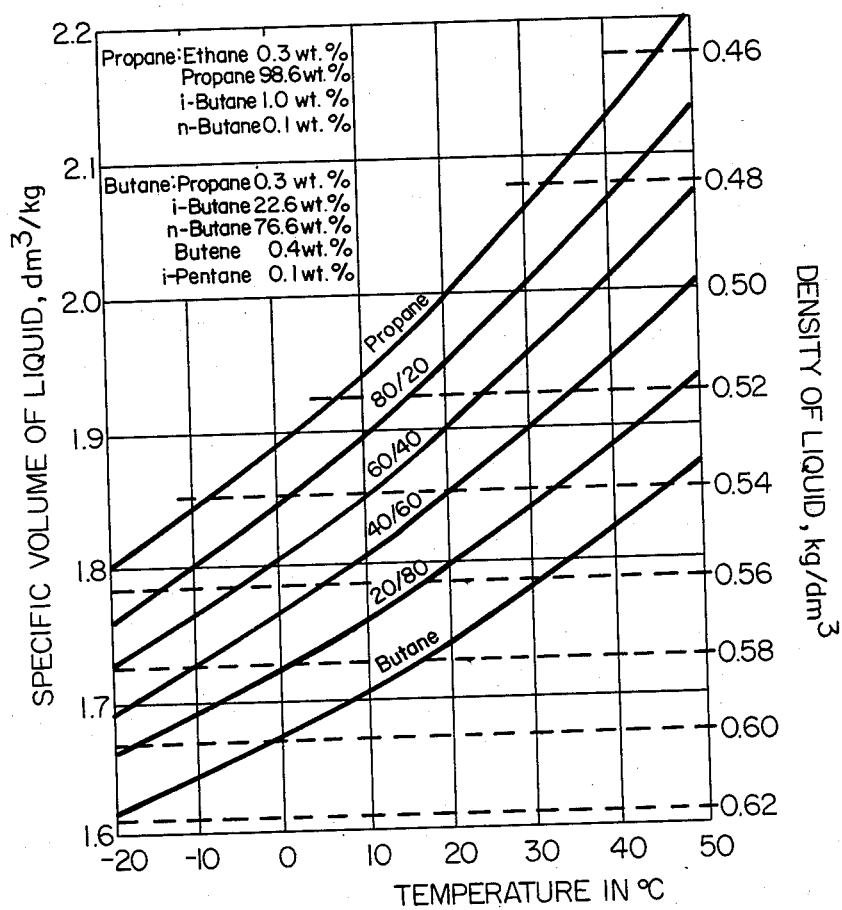
FIG. 3 shows the density of the liquid phase vs. temperature.
Figure 4:
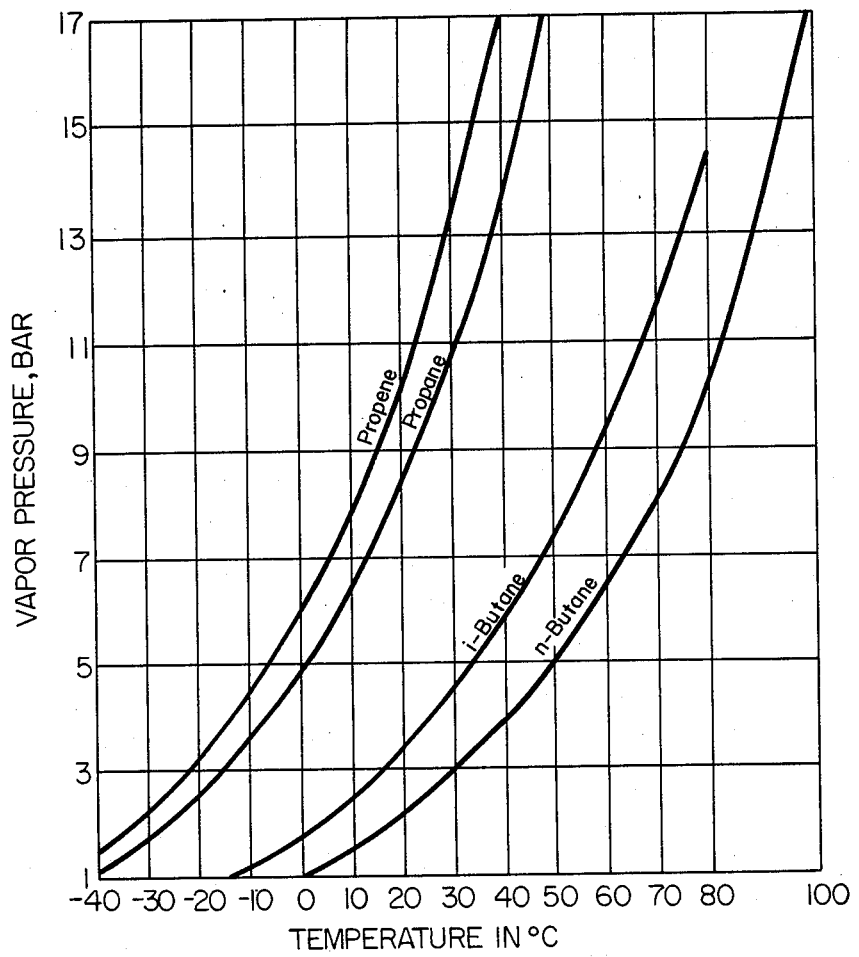
FIG. 4 shows the vapor pressure curve vs. temperature.

The liquefied gas is carried in the vehicle in pressure vessel (1). Butane is best suited for this, owing to its boiling point, which is 0° C. A pressure of 20 bar is sufficient to prevent the occurrence of gas bubbles in the injection nozzle at 110° C. With propane, a pressure of ca. 90 bar must be used. This leads to difficulties in terms of the service life of the compressing pump required. The tank jackets are screwed into tank flange (2), as are e.g. the refueling pipe (4), the dip tube (3) with gas-withdrawal/takeoff valve (7) for removing the liquid phase if liquefied gas is being used as the fuel, the backstroke valve (5), as well as the spring-loaded pressure safety valve (6).

The liquid phase is withdrawn via (3) and (7), and flows via piping (8) to compressing pump (9). The latter is driven by the engine (10) via speed reducer (11) and magnetic coupling (12). An electrical drive can also be used, and is of interest in the case of stationary engines.

The magnetic coupling (12) is controlled via pressure switch (13). In place of magnetic coupling (12), a so-called storage-load valve can also be used. When the desired pressure is reached, this load valve switches pump (9) over to pressure-free rotation.

The gas flows to the vessel system (14),(15) via backstroke valve (33). The pressurized storage unit (15) is filled on its gas side with an inert gas, e.g. $N_2$.

The pressure vessel (14) is equipped with a heating radiator (16). The hot cooling water is withdrawn from the engine (10) at (17); it flows through (16) via magnetic valve (21) back to (18) on the engine (10).

The thermostat (20), with temperature sensor (19), controls magnetic valve (21). In this way the temperature of the gas in vessel (14) can be held approximately constant, by controlling the intake of heating water.

The gas flows from vessel (14) via piping (22) to ignition-controlled magnetic valve (37) and piping (35) to injection nozzle (34) via backstroke valve (65). This valve (65) can likewise be integrated into (34) at (66).

At the same time, the liquid phase or optionally the compressed gas flows out from piping (22) to vessel (23). This vessel is divided by a membrane into spaces (24) and (25). The level of filling in space (25) can be observed through a sight glass (26). Vessel (28) with sight glass (29) is filled with pressurized oil. Oil can be conveyed into space (25) from (28) by means of hand pump (27). If desired, this can also be done with an electrically driven gear pump. Here the filling level in (25) is monitored electrically. The electric pump is controlled in this way.

The gas pressure is established in space (24). Thus the oil pressure in (25) is the same as the gas pressure in (24). Likewise, via piping (30), the exhaust side of the metering pump (31) is under the same pressure as the gas. Piping (32), including the control oil space of injection nozzle (34), is also under the same oil pressure. Liquefied gases, e.g. butane or propane, must be conveyed to compressing pump (9) under excess pressure, since otherwise bubbles of vapor will form in line (8) which runs from pressure vessel (1) to pump (9).

At temperatures below +3° C., the pressure in vessel (1) is no longer sufficient. This can cause difficulties in starting. In order to circumvent these difficulties, the pressure in vessel (1) is monitored by means of pressure switch (39). If the pressure in vessel (1) falls below the set point, magnetic valve (41) is actuated. However, this assumes that switch (40) is closed. It is coupled with the ignition switch, and is closed only if the ignition is turned on. In this way, propane gas (boiling point −42° C.) continues to flow out of vessel (42) via manual shut-off valve (43) into pressure vessel (1), until pressure switch (39) opens and magnetic valve (41) closes. During engine operation, a small amount of warmed butane constantly flows through piping (67) with throttle (68) into pressure vessel (1), as a result of which a slight excess pressure always prevails in this vessel.

This manner of generating pressure can be dispensed with in countries whose lowest temperature is +5° C.

Figure 2

The injection nozzle for liquefied gas or compressed gas differs from an injection nozzle for liquid fuel, in that a pressure converter is integrated into the system. Furthermore, the pressurized oil supplied by pump (31) serves only to operate nozzle needle (47), to lubricate and seal nozzle needle (47) in its housing (46), as well as to operate the pressure converter.

The quantity of oil which flows in is controlled by the oblique-edge control of the pump piston as in the case of a diesel injection pump. A piston is used whose oblique edge is arranged in such a way that delivery [of oil]stops at the top dead center position of the piston.

At the same moment in time, the external ignition is induced.

The nozzle holder is denoted as (44). Nozzle (45) is inserted into it. Nozzle needle (47) slides in the central borehole (46). Groove (48) is supplied with oil via borehole (53). Spaces (49) are filled with gas, which flows in via boreholes (56) and (57). The ribs are denoted as (50). Nozzle needle (47) lies against valve seat (52) with valve poppet (51) and blocks the gas from exiting (49).

Pressure pin (55) is mounted without play in flange (54). It is supplied with oil via borehole (66) from borehole (60). Groove (59) permits the flow of oil to borehole (53).

Space (68) is relieved of pressure via borehole (67); an oil which leaks is returned to vessel (28), FIG. 1, by means of piping (38).

Piston (62) is arranged to move axially in cylinder (61). Pressure spring (63) acts on this piston (62), so that piston (62) acts via the pressure pin (55) on nozzle needle (47). The pressure exerted by pressure spring (63) is thus the closure force which prevents an escape of gas from (52). After passing backstroke valve (65), the gas moves at (64) behind piston (62), and at the same time, by means of a tee, via (56),(57) into space (49). Backstroke valve (65) can likewise be integrated into the system.

The pressurized oil entering through borehole (58) and the compressed gas entering at (64) are under the same pressure through about 330° of rotation of the pump shaft of pump (31). Groove (48) and pressure pin (55) are also supplied with the oil. Over this angle of 330°, measured at the pump shaft, full pressure equilibrium prevails. The closure force at (51), (52) is thus applied exclusively by means of pressure spring (63).

At the start of delivery by pump (31), the pressure rises under the piston until the force of pressure spring (63) is reached. With further delivery, piston (63) moves upward; as a result, the gas above the piston is brought to a higher pressure, and in turn the pressure in spaces (49) also is increased. This pressure causes nozzle needle (47) to follow the motion of pin (55) upward, which exposes borehole (52). The gas flows into the combustion space of the cylinder of the internal combustion engine and is there ignited by the spark plug.

When the oil pressure falls, pressure spring (63) acts as a closure spring (51), shutting off the escape of gas at (52).

There is constantly oil between parts (47) in borehole (46) and the borehole of pressure pin (55); it acts as a sealing fluid and a lubricant.

Only during the actual injection process is the oil pressure somewhat higher than the gas pressure. Thus a pressure balance practically always prevails.

The piston can also be controlled with a pressurized oil system, by means of a rapid-switching magnetic valve. In such a case, the metering of fuel is effected via a computer based on the mass of air taken in, the engine temperature, the gas temperature, the engine r.p.m., etc. In addition it is possible, for example, to make use of a measurement of the exhaust gas, e.g. residual oxygen, to minimize the exhaust of harmful substances. With such a system having additional performance-graph ignition, exhaust gases may be achieved which are very low in harmful substances.

If compressed methane or similar compressed gases are used, parts (39) to (43) can be dispensed with.

Likewise vessel (14), FIG. 1, and reservoir (15) can be eliminated.

Compressing pump (9) is constructed as a gas compressor. It is only coupled in when the pressure in the gas reservoirs has fallen so low that the predetermined static pressure in the overall system is too low. This activation of the compressor can be signaled to the driver by means of the pressure switch, drawing his attention to the fact that the gas supply is coming to an end, and that refueling is necessary.

The gas temperature is maintained at a constant value by heating of the necessary high pressure reducer with cooling water, as well as the heating of vessel (14). This is state-of-the-art with liquefied gases; this temperature control was introduced by the present inventor in 1973.

The pressures and areas are elucidated as follows:

A static pressure of 30 bar is assumed, and a control pressure of 160 bar during injection.

| | | |
|---|---|---|
| Surface $F_1$ of pressure pin (55) | 5 mm$^2$ | (1) |
| Pressure 30 bar | 30 bar | (2) |
| Area pressure $F_1 \times$ bar = 5 mm$^2$ × 30 bar | 1.5 kgf | (3) |
| Area pressure at 160 bar 5 mm$^2$ × 160 bar | 8.0 kgf | (4),(5) |
| Area $F_2$ of the nozzle needle 80 mm$^2$ | 80 mm$^2$ | (6) |
| Pressure 30 bar | 30 bar | (7) |
| Area pressure $F_2$ at 30 bar 80 mm$^2$ × 30 bar | 24.0 kgf | (8) |
| Area pressure at 160 bar 80 mm$^2$ × 160 bar × 2 | 256.0 kgf | (9) |
| Ratio of area $F_2$ to area of piston (62) | 80:160 = 1:2 | (10) |

This gives a lowest pressure force of the pressure spring (63) equal to 24 kgf×2=48 kgf. This is the force of the spring; from this, 24 kgf (Equation 7) must be subtracted.

The factor 2 in equation (9) results from the area ratio in equation (10).

The system described here for blowing in or injecting compressed gases or liquefied gases requires only a slight change in the existing structural components which have proven useful through decades of operation. The problems of sealing and lubrication are solved; here the fact that the pressure on the gas side is equal to the pressure on the oil side is of enormous significance. The oil cannot be displaced by the gas, and the equal pressure means that a diffusion of the gas into the oil is minimized. Owing to the internal pressure conversion, the injection pressure or the pressure of blowing gas in is increased in proportion to the area ratio. In this way, the control oil pressure can be kept low. This control pressure basically determines the power consumption of pump (31).

The problem of cold starting at temperatures below 5° C. and with butane as the fuel gas is solved by pressurizing of pressure vessel (1) by means of the low-boiling propane (boiling point −42° C.) in gaseous form.

The boiling and evaporation of butane in the strongly heated injection nozzle (34) is avoided by having a minimum pressure of 20 bar in the system.

The different density of butane (liquid phase) is eliminated by heating in vessel (14). Until the predetermined temperature is reached at (20), the quantity injected is greater, in terms of weight; this manifests itself in the form of a slight increase in efficiency during a cold start. This is desirable, since the frictional values of the engine are higher in a cold start. The exhaust gases then have a somewhat higher content of harmful substances.

The system works as follows:

Initial startup

Valve (34) on vessel (42) is opened; magnetic valve (42) is actuated by closure of switch (40). As long as pressure switch (39) is closed, propane gas flows from (42) into pressure vessel (1). Liquid phase flows into the system via (3) by means of an auxiliary electrical circuit, by the actuation of (7).

The overall gas system is degassed as far as backstroke valve (65), so that liquid phase is present in the system.

Reservoir (25) is filled with pressurized oil from (28) by means of hand pump (27); this can be observed through (26). Then the total pressurized oil system is deaerated in known manner as far as nozzle (34).

After the auxiliary electrical circuits are shut off, the engine is started.

Normal operation, gas temperature >5° C.

When the first ignition impulse occurs, the magnetic valves (7) and (37) open, and pump (9) is loaded with liquid phase via (3) and (7). As long as reversing switch (13) is closed, magnetic coupling (12) is actuated and the engine (10) drives pump (9). This causes the gas pressure in (14) to rise to the value set at (13); (13) opens and pump (9) is turned off. Because of the slow warming of the cooling water at (17) and the open magnetic valve (21), the cooling water flows through (16) and warms the liquid phase in (14) until the preset temperature, measured by means of (19) and (20), is reached. The flow shut-off valve (21)—the flow of hot cooling water.

Pump (31), driven directly by the engine, delivers a definite quantity of pressurized oil to nozzle (34), depending on the r.p.m. and load. The rise in pressure underneath piston (62) causes this piston (62) to move in the direction (64) opposite to the spring force (63). In this way, after closing of backstroke valve (65), the pressure in gas spaces (49) is increased. This is governed by the ratio of the area of piston (62) to that of nozzle needle (47).

Despite the rise in pressure underneath piston (62), the motion causes pressure pin (55) to become unloaded, and it moves in direction (64). This motion is followed by nozzle needle (47), and the fuel can flow out at (52).

Owing to the control action of pump (31), the pressure of the pressurized oil drops precipitously at the top-dead-center position of the piston of pump (31); the pressure of the gas in space (49) below nozzle needle (47) becomes smaller, so that nozzle needle (47) blocks off the escape of gas at (52) under the action of closure spring (63). Any leak oil flowing out into space (68) is carried to (28) by means of piping (38).

A constant amount of warmed gas is returned via throttle (67) to pressure vessel (1) by means of piping (66), so that the gas in (1) is constantly brought to a temperature which is above the boiling point of the gas in vessel (1). In this way the consumption of propane from vessel (42) is limited.

The propane content of vessel (42) is indicated in kilograms. One kg of propane, when decompressed to normal pressure, produces 526 liters of gaseous propane. The consumption of propane in a cold start is thus relatively small. It depends on the filling level of vessel (1). The gaseous propane dissolves in liquid butane in vessel (1) and is combusted along with it.

This system of internal mixture formation can also be used for liquid fuels such as alcohols or gasoline.

Owing to the metering of gas in the form of an internal mixture formation, a so-called "layer-load operation" is achieved, whereby the harmful substances in the exhaust gases are greatly reduced. Freedom from soot and sulfur is attained with gas operation. It is thus possible to replace diesel operation with gas operation, without a significant increase in technical expense. Soot filters are dispensed with completely.

A way is shown here either to completely avoid emissions of harmful substances such as occur in diesel operation (smoke, $SO_2$), or to reduce to a minimum the emission of harmful substances in the form of aromatics and nitrogen oxides.

The operation with compressed natural gas is based on an existing supply network for compressed natural gas in Europe having a supply pressure of at least 40 bar, so that it is only necessary to provide refueling capabilities in the form of compressors for raising the pressure from 40 bar to 300 bar, including the necessary gas depots. This results in a diversification which is of interest from the supply viewpoint.

I claim:

1. In a system for providing a fuel mixture for an internal combustion engine which includes a first fuel preparation system and a second injection system for introducing the fuel mixture to the combustion zone of an internal combusion engine, the improvement including:

means in the preparation system for bringing a liquid fuel to a pressure at a temperture over 100° C. and maintaining the fuel in a liquid state; said means including a compressing pump (9) and a compensation means to adapt the fuel density to ambient temperature; said compensation means consisting of a vessel (14) having a heating coil (16) operable by means of cooling water recirculated from the engine (10), which vessel is connected in series after the compressing pump (9), and in which the fuel is heated such that the fuel temperature is above the ambient temperature, and said compensation means further includes a thermostat and magnetic valve in the heating coil circuit, by which the temperature is regulated;

a metering pump for providing a predetermined control oil pressure for regulating the introduction of fuel into the engine and an injection valve (34) in the injection system and means for operatively interconnecting the pressure of the vessel, the pressure of the fuel introduced by the injection valve and the control oil pressure from the metering pump, whereby the control oil pressure and the pressure of the fuel mixture in the preparation system are the same except when fuel is injected into the combustion zone of the engine.

2. A system in accordance with claim 1 including a nozzle needle reciprocably mounted in a borehole in the injection system in which the needle and borehole are lubricated and sealed at the same time, and lubricating oil is maintained between said needle and borehole in said means as a result of the equality of pressure of the fuel and the control oil.

3. A system in accordance with claim 1 in which the equalization of the pressure of the control oil and the fuel oil minimizes the diffusion of the fuel into the control oil.

4. A system in accordance with claim 2 in which the equalization of the pressure of the control oil and the fuel oil minimizes the diffusion of the fuel into the control oil.

5. A system in accordance with claim 1 in which the compressing pump in the fuel preparation system is driven by the engine and the pump includes a pressure switch to maintain the pressure in the vessel constant, which pressure switch (13), when a preset pressure is reached, deactuates the compressing pump by means of a magnetic coupling (12).

6. A system in accordance with claim 1 including means by which the compressing pump is switched over to a pressure-free rotation by means of a storage-load valve when a pre-set pressure is reached.

7. A system in accordance with claim 5 including a storage-load valve by which the compressing pump is switched over to pressure-free rotation.

8. A system in accordance with claim 1 in which the vessel (14) includes a pressure reservoir (15) which maintains the fuel pressure in the system connected in series with the vessel (14) when the engine is stopped, and a backstroke valve (33) by which an outflow in the direction of pump (9) is prevented.

9. A system in accordance with claim 1 in which the fuel under pressure in the vessel (14) is heated by means of the engine cooling system from which water is withdrawn and circulated and the vessel further includes a sensor (19) and a thermostat (20) in a control rerlationship with a magnetic valve (21) connected to the engine cooling system, so that the temperature of the fuel in vessel (14) remains approximately constant.

10. A system in accordance with claim 1 further including a pump (27) and a further oil containing vessel (28) having a sight glass (29), whereby the fuel pressure is exerted on one-half of pressure vessel (23) at (24), and sufficient oil is pumped into the other half at (25), until approximately the same quantity of liquid control pressure oil and liquid fuel, respectively, are present.

11. A system in accordance with claim 10 in which a gaseous fuel is introduced and pressure vessel (23) is subjected to the gas pressure on one side.

12. A system in accordance with claims 10 or 11 in which the means for equalizing pressure equalizes pressure of the control oil, the metering pump, piping (32) and the metering portion of the injection valve, and the pressure is maintained equally as the fuel pressure which exists at the cylinder in the engine to which the fuel is injected.

13. A system in accordance with claim 1 in which the metering pump (31) has a diagonal-edge control means, via piping (32), connection (58) and borehole (60) on piston (62) in the engine, which means can move axially in the engine cylinder (63), whereby the quantity of control oil required for injection is provided by the metering pump means.

14. A system in accordance with claim 1 in which the injection valve is formed in a housing (44) and includes a nozzle needle (47), operatively disposed in the cylinder combustion zone, which zone is filled with fuel under pressure and which nozzle needle (47) is subjected to pressurized oil by means of borehole (56) and (66) groove (48) in the housing, and in which the pressurized oil has the same pressure as the fuel in the combustion zone (49) and in which the nozzle needle (47) is lubricated in its borehole (46), and is sealed by the pressurized oil.

15. A system in accordance with claim 1 including a pressure pin (55) in an operative relationship with a nozzle needle in the injection systems, which pin is guided into an intermediate flange (54) and subjected to pressurized oil via borehole (66), so that the pressurized oil effects lubrication and sealing of the combustion zone.

16. A system in accordance with claim 1 in which the nozzle needle (47) includes a deaeration means.

17. A system in accordance with claim 15 in which the nozzle needle (47) includes a deaeration means.

18. A system in accordance with claim 1 including a pressure spring (63) and piston (62), guided in an engine cylinder (61), operatively interconnected with a pressure pin (55), whereby the pressure of the pressure spring (63) acts as a closure pressure on a nozzle needle of the injection system (47) and further including a valve poppet (51) on the nozzle needle to prevent an escape of fuel from the injection system.

19. A system in accordance with claim 15 including a pressure spring (63), and piston (62), guided in cylinder (61), operatively interconnected with the pressure pin (55), whereby the pressure of the pressure spring (63) acts as a closure pressure on the nozzle needle (47) and further including a valve poppet (51) on the nozzle needle to prevent an escape of fuel from the injection system.

20. A system in accordance with claim 1 including boreholes in the engine which provide a means for conveying the control oil pressure.

21. A system in accordance with claim 1 having a piston and nozzle needle in the injection system in which the ratio of the areas of the cross section of piston (62) to the cross section of nozzle needle (47) is 2:1, whereby an internal pressure elevation of oil relative to fuel occurs in (34) owing to the metering oil pressure of pump (31).

22. A system in accordance with claim 14 having a piston in the injection system in which the ratio of the areas of the cross section of piston (62) to the cross section of nozzle needle (47) is 2:1, whereby an internal pressure elevation of oil relative to fuel occurs in (34) owing to the metering oil pressure of pump (31).

23. A system in accordance with claim 19 in which the ratio of the areas of the cross section of piston (62) to the cross section of nozzle needle (47) is 2:1, whereby an internal pressure elevation of oil relative to fuel occurs in (34) owing to the metering oil pressure of pump (31).

24. A system in accordance with claim 20 in which the ratio of the areas of the cross section of piston (62) to the cross section of nozzle needle (47) is 2:1, whereby an internal pressure elevation of oil relative to fuel occurs in (34) owing to the metering oil pressure of pump (31).

25. A system in accordance with claim 1 including a leak removal system in which leaking gas is collected into vessel (28) via the leak removal system during the operation of the combustion engine with gaseous fuels and is exhausted to the intake air in the intake zone of the internal combustion engine.

26. A system in accordance with claim 17 including a leak removal system in which leaking gas is collected into vessel (28) via the leak removal system during the operation of a combustion engine with gaseous fuels and is exhausted to the intake air in the intake zone of the internal combustion engine.

27. A system in accordance with claim 1 including means for electromagnetically metering pressurized oil which means is controlled by a computer.

28. A system in accordance with claim 13 including means for electromagnetically metering pressurized oil which means is controlled by a computer.

29. A system in accordance with claim 27 in which a piezoelectric actuator is the means for metering of pressurized oil.

30. A system in accordance with claim 1 including a source of butane as a fuel and in which gaseous propane is fed to vessel (1) from pressure bottle (42) at temperatures slightly above the boiling point of the butane or below, via pressure switch (39), ignition switch (40) and magnetic valve (41), so that the formation of vapor bubbles in piping (8) is prevented as a result of the excess pressure in vessel (1).

31. A system in accordance with claim 10 including a compressing pump driven by an electric motor and means for controlling said compressing pump comprising a filling level sensor in vessel (23).

32. A system in accordance with claim 1 including a gaseous fuel source in the form of high-pressure gases such as methane, sewer gas, depot gas and similar gases and further including means to lower the pressure of the gases comprising a first pressure reducer located within the high-pressure vessel to reduce the vessel pressure to the operating pressure of the system, and a fine-pressure regulator connected in series after the vessel.

33. A system in accordance with claim 32 including a fine-pressure reducer that is heated by means of cooling water and regulated by a thermostat, in a manner such that the temperature of the exiting fuel gas is help approximately constant.

34. A system in accordance with claim 5 in which the compressing pump (9) is a compressor which becomes operational by means of pressure switch (13) when the system pressure reaches approximately the pressure at the exit side of the pressure reducer, and the high pressure vessel can be almost emptied, whereby the pressure reducer integrated into the high pressure vessel and allows the stored gas to flow out completely, since the pressure in front of this pressure reducer is smaller than the pressure set for the exit side of the pressure reducer.

35. A system in accordance with claim 5 including a means for signaling an operator, in correspondence with the switching function of pressure switch (13) so that the operator is informed that the fuel supply is falling and that refueling is required.

* * * * *